United States Patent [19]

Rooney

[11] 4,321,343

[45] Mar. 23, 1982

[54] POLYISOBUTYLENE/PHENOL POLYMERS TREATED WITH DIISOCYANATES AND POLY(OXYALKYLENE)POLYOLS

[75] Inventor: John M. Rooney, Kildare County, Ireland

[73] Assignee: W. R. Grace & Co., New York, N.Y.

[21] Appl. No.: 198,038

[22] Filed: Oct. 17, 1980

[51] Int. Cl.$^3$ ............... C08F 283/00; C08G 18/22; C08G 18/24; C08G 18/63

[52] U.S. Cl. .................. 525/534; 525/131; 528/55; 528/58; 528/75

[58] Field of Search ............ 528/75, 55, 58; 525/131, 534

[56] References Cited

U.S. PATENT DOCUMENTS

| | | | |
|---|---|---|---|
| 3,069,373 | 12/1962 | Greenlee | 260/28 |
| 3,418,359 | 12/1968 | Barie et al. | 560/1 |
| 3,420,915 | 1/1969 | Braithwaite | 528/44 |
| 3,515,772 | 6/1970 | Lubowitz et al. | 528/75 |
| 3,674,743 | 7/1972 | Verdol et al. | 528/68 |
| 3,689,593 | 9/1972 | Jackson | 260/31.2 N |
| 3,697,428 | 10/1972 | Meinhardt et al. | 560/198 |
| 3,846,163 | 11/1974 | Kest | 260/27 BB |
| 3,859,382 | 1/1975 | Hergemother et al. | 528/44 |
| 3,948,800 | 4/1976 | Meinhardt | 252/32.7 E |
| 3,953,406 | 4/1976 | Marsh | 528/75 |
| 3,989,768 | 11/1976 | Milkovich et al. | 525/130 |
| 4,101,434 | 7/1978 | Edwards et al. | 252/52 R |
| 4,101,473 | 7/1978 | Lander | 260/22 R |
| 4,107,144 | 8/1978 | Russell et al. | 260/45.95 D |
| 4,120,804 | 10/1978 | Smith et al. | 252/47.5 |
| 4,151,341 | 4/1979 | Lalk et al. | 260/29.6 RW |

OTHER PUBLICATIONS

Bauer et al., Jour. Polymer Sci. Part A-1, vol. 9, No. 5, May 1971, pp. 1451-1458.

*Primary Examiner*—H. S. Cockeram
*Attorney, Agent, or Firm*—Philip M. Pippenger

[57] ABSTRACT

Disclosed herein are block copolymers prepared by polymerizing isobutylene in the presence of an alkyl-substituted phenol as chain transfer agent followed by reaction with a diisocyanate and coupling to a polyoxyalkylene polyol.

16 Claims, No Drawings

POLYISOBUTYLENE/PHENOL POLYMERS TREATED WITH DIISOCYANATES AND POLY(OXYALKYLENE)POLYOLS

BACKGROUND OF THE INVENTION

Block copolymers are well-known items of commerce. Specifically, cationic polymerization of isobutylene is well-known and the use of various polyisocyanates in the formation of block copolymers has been described. Thus, Bauer et al. (*Can. J. Chem.*, 48, 1251 (1970); *J. Polym. Sci.*, A-1, 9, 1451 (1971)) describe cationic polymerization of isobutylene using alkyl-substituted phenols as chain-transfer agents. U.S. Pat. No. 3,689,593 discloses formation of graft copolymers by vinyl polymerization of an acrylate in the presence of various thiols, alcohols and amines as chain-transfer agents followed by reaction with a diisocyanate. Vinyl monomers are then polymerized in a solution of the isocyanate-terminated copolymers which are coupled to the polyolefin. Rahman et al. (J. Macromol. Sci.-Chem., A13(7), pp. 953–969 (1979)) describe block copolymers containing hydrophilic and hydrophobic sequences formed by reacting hydroxy-terminated polybutadiene with an isocyanate-terminated polyethylene oxide.

In U.S. Pat. No. 3,953,406 a mixture of hydrophilic and hydrophobic materials (e.g., polybutylene polyols) is admixed with a cross-linking agent and a diisocyanate followed by curing. U.S. Pat. No. 3,420,915 describes polymers formed from phenols and monomeric hydrocarbons which can be modified with diisocyanates and hydroxy polyethers. U.S. Pat. No. 3,859,382 describes anionic polymerization of olefins containing cyano, ester, nitro or amine groups followed by reaction with a polyisocyanate and subsequently with polyethers, polyamides etc. to form various block copolymers. In U.S. Pat. No. 3,989,768 graft copolymers are formed having various backbone segments linked to anionically-polymerized side chains which are said to include isobutylene (col. 9, line). Various linkages are formed by the use of isocyanates.

Numerous polyurethane block copolymers containing both hydrophobic and polyoxyalkylene blocks have also been described, e.g., U.S. Pat. No. 3,515,772 (col. 2, lines 11–23; col. 3, lines 11–15 and 38; and col. 6, line 16); U.S. Pat. No. 3,846,163 (col. 8, lines 25 and 28; col. 9, line 37; and col. 10, lines 75-col. 11, line 2); and U.S. Pat. No. 3,674,743 (cols. 1, 2, 4, 5, 6 and especially col. 6 lines 46–68 and col. 7, line 19).

U.S. Pat. No. 3,069,373 describes phenol-terminated polymers which are reaction products of various unsaturated petroleum resins with phenols. The phenol-modified resins are further reacted with polyepoxides. U.S. Pat. No. 4,101,473 describes phenol-blocked isocyanate prepolymers and polyurethanes prepared therefrom.

While the above patents and journal articles generally use various agents to couple the copolymer blocks, U.S. Pat. No. 3,418,359 relates to a process for producing olefin-polyalkylene oxide graft copolymers which are directly joined. U.S. Pat. No. 3,376,361 describes block copolymers containing oxymethylene groups along with co-monomers such as isobutylene.

U.S. Pat. No. 4,101,434 describes low temperature copolymerization of isobutylene and styrene in the presence of alkyl phenols. In U.S. Pat. No. 4,107,144 phenolic antioxidants are prepared by admixing a dialkyl phenol, a vinylic monomer (e.g., isobutylene), a Friedel Crafts or Lewis acid type catalyst, and an aprotic solvent; polymerizing the monomer at a temperature below 0° C. and stopping the reaction when the polymer has attained a molecular weight of 1000 to 5000.

DESCRIPTION OF THE INVENTION

The invention is a block copolymer of the following structure:

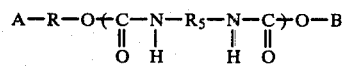

wherein A is a polyisobutylene segment; R is a divalent alkyl-substituted phenyl residue wherein the alkyl substituent groups are lower alkyl having from 1 to 4 carbons each with the total number of carbon atoms being from 2 to 10. $R_5$ is a divalent aliphatic, aromatic, or cycloaliphatic or cycloalkylene group of from 1 to 36 carbons; and B is a polyalkylene oxide segment containing oxyethylene, oxypropylene or mixtures thereof.

The copolymer compositions can be employed as ashless oil dispersants, e.g., see U.S. Pat. No. 4,120,804; U.S. Pat. No. 3,697,428; and U.S. Pat. No. 3,948,800. Also, the polymers of the invention can be employed as aqueous dispersing agents for particulate matter. See U.S. Pat. No. 4,151,341.

As discussed, in the polymer composition A is a polyisobutylene segment which should have a molecular weight of from about 1000 to 5000 and preferably from 1000 to 3500. R is a divalent alkyl-substituted aromatic residue wherein the alkyl substituents have from 2 to 10 carbons and preferably from 2 to 8. Examples of suitable R groups include phenyl residues having the following formulae:

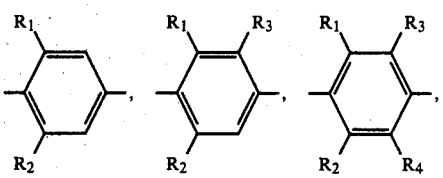

$R_1$, $R_2$, $R_3$ and $R_4$ are independently selected from lower alkyl groups having from 1 to 4 carbon atoms, e.g., methyl, ethyl, propyl, butyl, sec-butyl, isobutyl, t-butyl and isopropyl.

As discussed, $R_5$ contains from 1 to 36 carbon atoms and as will be described below, $R_5$ is the divalent hydrocarbon residue of a diisocyanate. Illustrative of suitable diisocyanates are toluene diisocyanate, 1,6-hexamethylamine diisocyanate, lysine diisocyanate, diphenylmethane-4,4'-diisocyanate and isophorone diisocyanate with toluene diisocyanate being preferred.

In the above polymer structure, the B group is an oxyalkylene polymer residue comprising oxyethylene units, oxypropylene units, or mixtures thereof, and can contain small amounts of higher oxyalkylene groups, e.g., up to 20% on a molar basis can be oxybutylene. Preferably, the oxyalkylene residue is hydrophilic, e.g., polyoxyethylene or a block oxyethylene/oxypropylene copolymer or a random oxyethylene/oxypropylene copolymer. To achieve satisfactory hydrophilicity the B unit should preferably contain at least 50% on a molar basis of oxyethylene units. While the oxyalkylene polymer is generally essentially linear, branched polymers can also be employed, e.g., the reaction product of trimethyllol propane, glycerol, triethanol amine or other suitable initiators (functionality of 3 or greater) with ethylene oxide, propylene oxide or mixtures thereof. The molecular weight of the polymeric B residue is from 1000 to 5000 and preferably from 2000 to 4000 as determined by vapor pressure osmometry or by gel permeation chromatography.

The polymer composition of the invention is prepared by cationically polymerizing isobutylene in the presence of an alkyl-substituted phenol, a Lewis acid catalyst or Friedel-Crafts catalyst, and an organic liquid to produce a phenol-terminated polymer. The phenol-terminated polymer is reacted with a diisocyanate and optionally a catalyst by a condensation reaction to form an isocyanate-terminated polymer. Subsequently the isocyanate-terminated polymer is reacted with a polyoxyalkylene polyol, i.e., the polyol precursor of the B units described above.

Cationic polymerization of isobutylene in the presence of a phenol is described in R. F. Bauer, R. T. LaFlair, and K. E. Russell, *Can. J. Chem.*, 48, 1251 (1970) and R. F. Bauer and K. E. Russell, *J. Polym. Sci.*, A-1, 9, 1451 (1971) which are hereby incorporated by reference. The cationic polymerization involves dissolving the isobutylene monomer in a suitable organic solvent for the monomer and the phenol. The Lewis acid or Friedel-Crafts catalyst can be added at any convenient time during dissolution of the reactants or thereafter. In the reaction mixture, the initial monomer/phenol ratio is from 0.1 to 10 and preferably from 0.5 to 5; the initial phenol/catalyst molar ratio is from 100 to 1000 and the initial concentration of monomer in the reaction mixture (wt. basis) is from 0.2 to 5 mol $l^{-1}$ and preferably from 0.5 to 2.5 mol $l^{-1}$. The polymerization reaction is allowed to continue until the polymer attains a suitable molecular weight, e.g., from about 5 minutes to about 30 minutes. During polymerization the temperature is maintained below 0° C. and preferably from $-20°$ to $-80°$ C.

The catalyst is a Lewis acid or a Friedel-Crafts catalyst such as aluminum chloride, stannic chloride/acetic acid, boron trifluoride, titanium chloride or other acid catalyst of this type such as $AlBr_3$, $SbF_5$, $SbCl_5$, $PF_5$ or $FeCl_3$. In some cases, particularly with stannic chloride, an acid is desirably added as cocatalyst, e.g., acetic acid, a phenol or HCl; or a small amount of water can be present if an increased reaction rate is desired. A convenient range for the catalyst concentration is from about 0.05% to about 3% by weight, of the reaction mixture. The concentration range for cocatalyst is usually about 0.05% to about 3% by weight of the reaction mixture.

Suitable aprotic solvents include halogenated hydrocarbons (e.g., methyl chloride, methylene chloride, ethyl chloride, trichloroethylene and chloroform), and aliphatic hydrocarbons containing from 4 to 12 carbon atoms and particularly commercially-available mixtures thereof. Generally, the organic solvent should have a boiling point (normal atmospheric) pressure) of from 10° to 100° C. and should be a solvent for both polyisobutylene and the phenol employed.

Suitable phenols are substituted by one or more lower alkyl groups having from 1 to 4 carbon atoms with the total number of carbons in the substituent groups being from 2 to 10 and preferably 2 to 8. Suitable phenols include those having the following structure:

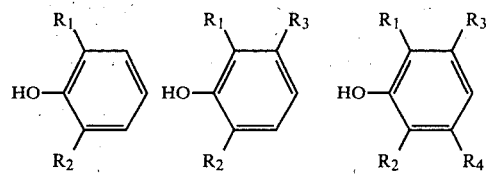

wherein $R_1$, $R_2$, $R_3$ and $R_4$ are as defined above. Illustrative examples of phenols include 2-sec-butyl phenol, 2,6-dimethyl phenol, 2,6-diisopropyl phenol, 2,6-di(2-sec-butyl) phenol, 2,3,4,6-tetramethyl phenol 3-ethyl-2,6-diisosbutyl phenol 2,3,5,6-tetraethyl phenol and 2,3,6-triisopropyl phenol.

Instead of the single ring phenols, similar alkylsubstituted diphenols or bisphenols can be used provided there is a vacant 4 or 6 position on one or more benzene rings. Suitable polynuclear phenols include 6,6'-dialkyl-2,2'-biphenol, 2,2'-dialkyl-4,4'-isopropylidenediphenol, 6,6'-dialkyl-2,2'-methylenediphenol and dialkyl-2,4'-ethylenediphenol.

As discussed above, the phenol appears to act as a chain transfer agent to terminate the polyisobutylene chain, i.e., during polymerization of the isobutylene the chains attach to the vacant 4 or 6 position on the phenol nucleus. The phenol also appears to function to some extent as an initiator for the polymerization reaction. It has been observed that polymerizations of isobutylene initiated in the presence of phenols by either aluminum trichloride or tin tetrachloride yield products of decreasing molecular weight as the initial phenol concentration is increased. Incorporation of phenolic end groups, suggesting chain transfer by ring alkylation, does occur but the predominant chain breaking reaction is believed to be expulsion of a proton to form an ethylenically-unsaturated end group. Maximum yields for the chains containing the phenol end group are about 50%. Reduced temperature and monomer concentration both increase polymer yields without significantly affecting molecular weight or phenol incorporation.

Following the polymerization reaction, the phenol-terminated polymer is further reacted with a diisocyanate to cap the hydroxyl group of the phenol. The molar ratio of the diisocyanate to the free phenol hydroxyl groups on the polymer is from 0.5 to 1.5 and preferably 1.0. Suitable diisocyanates are described above.

The isocyanate-terminated polymer is reacted with a polyoxyalkylene polyol, i.e., the precursor of the B polymer residues described above. The reaction is generally carried out in a suitable solvent for the product, e.g., THF. The molar ratio of free NCO contributed by the isobutylene polymer to hydroxyl units contributed by the polyol is from 0.5 to 1.5.

EXAMPLE 1

Numerous runs were conducted wherein isobutylene monomer was polymerized under vacuum in Pyrex ® vessels equipped with Teflon ® stirring blades and syringe caps. Known volumes of solvent and isobutylene were condensed into the vessels and phenols (2-sec-butyl phenol or 2,6-dimethyl phenol) were added through the syringe caps prior to addition of a Lewis acid catalyst ($AlCl_3$). The reactions were terminated after 15 minutes by the addition of methanol. Where $AlCl_3$ was used, the reaction mixture contained 0.72 mole/liter of thionyl chloride to solubilize the AlCl$_3$. The amount of reactants (in mole/liter of reaction mixture), polymerization temperature and results are set forth in Table I.

TABLE I

Polymerizations of Isobutylene (IB) Initiated by Aluminum Trichloride (AlCl$_3$) in Methylene Dichloride Solution Containing 2-sec-Butyl Phenol (Ph).

| T, °C. | Isobutylene (mol l$^{-1}$) | AlCl$_3$ (10$^{-2}$ mol l$^{-1}$) | 2-sec-butyl phenol (10$^{-2}$ mol l$^{-1}$) | Yield, % | $\overline{M}_w$ | $\overline{M}_n$ | % Phenol-Capped Chains |
|---|---|---|---|---|---|---|---|
| −70 | 2.4 | 4.5 | 0.4 | 88.6 | 23,900 | 11,800 | 2.1 |
| −70 | 2.4 | 4.5 | 0.8 | 81.8 | 12,100 | 5,800 | 1.5 |
| −70 | 2.4 | 4.5 | 2.0 | 68.4 | 17,200 | 8,400 | 4.7 |
| −70 | 2.4 | 4.5 | 4.0 | 75.6 | 9,700 | 2,900 | 5.4 |
| −70 | 2.4 | 4.5 | 8.0 | 55.3 | 6,400 | 2,800 | 19.8 |
| −70 | 2.4 | 4.5 | 20.0 | 43.4 | 7,000 | 4,000 | 16.5 |
| −50 | 2.4 | 4.5 | 4.0 | 46.9 | 10,200 | 4,400 | 7.5 |
| −30 | 2.4 | 4.5 | 4.0 | 27.1 | 6,700 | 3,200 | 2.8 |
| −10 | 2.4 | 4.5 | 4.0 | 13.7 | 5,200 | 2,900 | 2.3 |
| −70 | 0.7 | 4.5 | 4.0 | 87.5 | 10,800 | 3,000 | 4.3 |
| −70 | 4.1 | 4.5 | 4.0 | 53.8 | 11,400 | 4,000 | 5.1 |
| −50 | 2.4 | 0.45 | 8.0 | 0.0 | — | — | — |
| −70 | 2.4 | 2.3 | 4.0 | 30.7 | 9,500 | 3,900 | 6.6 |
| −70 | 2.4 | 4.5 | 10.0(a) | 57.9 | 11,600 | 3,600 | 14.7 |
| −70 | 2.4 | 4.5 | 5.0(a) | 65.8 | 12,900 | 4,400 | 8.9 |
| −70 | 2.4 | 4.5 | 2.5(a) | 66.5 | 11,300 | 4,100 | 2.6 |

FOOTNOTES
(a) In these reactions 2,6-dimethyl phenol was substituted for 2-sec-butyl phenol.

Following polymerization, the phenol-capped polyisobutylene was reprecipitated from THF solution before drying to constant weight for the determination of percentage monomer conversion. Polymer molecular weights were estimated by differential refractive index measurements on a Waters Model 244 high-pressure liquid chromatograph equipped with columns of 1000, 500 and 100 Aμ-Styragel. THF was used as the mobile phase. A standard GPC calibration for polyisobutylene derived by Kinnedy et al. (J. Poly. Sci. (Chem), 15, 2801 (1977); 16, 243 (1978) was used to calculate the molecular weights. The distribution of phenol within polymer samples was determined by differential U.V. spectroscopy on a Waters Model 440 absorbance detector adjusted to a wavelength of 280 nm. The infrared spectra of polymer samples were measured on a Beckman Model IR4 spectrophotometer and proton n.m.r. spectra were measured for CDCl$_3$ solutions on a Varian spectrometer.

EXAMPLE 2

Following the procedure of Example 1, isobutylene was again polymerized using n-heptane as solvent. The total phenol concentrations were measured by U.V. spectroscopy (Cary 14 M spectrophotometer). The initial concentrations of reactants are as follows: AlCl$_3$=4.5×10$^{-2}$ mol l$^{-1}$; isobutylene=2.4 mol l$^{-1}$; 2-sec-butyl phenol=4.0×10$^{-2}$ mol l$^{-1}$ and thionyl chloride=0.72 mol l$^{-1}$.

TABLE II

| T, °C. | Yield, % | $\overline{M}_w$ | $\overline{M}_n$ | % Phenol-Capped Chains |
|---|---|---|---|---|
| −70 | 32.8 | 14,000 | 4,600 | 32.5 |
| −50 | 49.3 | 14,500 | 7,500 | 15.7 |
| −30 | 30.8 | 11,400 | 5,200 | 28.3 |
| −10 | 23.0 | 8,800 | 4,600 | 8.6 |

EXAMPLE 3

Following the procedure of Example 1, isobutylene was polymerized using methylene chloride as the solvent and SnCl$_4$ as Lewis acid catalyst. No thionyl chloride was employed. After 30 minutes, the reaction was quenched with methanol. The initial reactant concentrations were; isobutylene=2.4 mol l$^{-1}$ and SnCl$_4$=0.10 mol l$^{-1}$. The concentration of the 2-sec-butyl phenol and reaction conditions and results obtained are set forth in Table III below.

TABLE III

| T, °C. | 2-sec-butyl Phenol | Yield % | $\overline{M}_w$ | $\overline{M}_n$ | % Phenol Capped Chains |
|---|---|---|---|---|---|
| −30 | 0.16 | 97.1 | 5,700 | 2.530 | 12.0 |
| −30 | 0.24 | 79.3 | 5,400 | 1,400 | 7.7 |
| −50 | 0.08 | 100.0 | 9,400 | 4,100 | 11.3 |
| −50 | 0.16 | 80.6 | 6,400 | 3,100 | 17.6 |
| −50 | 0.24 | 95.0 | 8,100 | 2,800 | 33.1 |
| −50 | 0.32 | 100.0 | 3,700 | 1,900 | 32.6 |
| −50 | 0.40 | 84.8 | 4,200 | 2,200 | 47.0 |
| −50 | 0.80 | 39.7 | 1,800 | 920 | 26.2 |
| −70 | 0.16 | 62.3 | 8,900 | 5,100 | 30.9 |
| −70 | 0.24 | 64.5 | 5,400 | 3,200 | 23.8 |

EXAMPLE 4

Following the procedure of Example 1, isobutylene was polymerized using methylene chloride as solvent and SnCl$_4$ as the acid catalyst. The reactions were carried out at a temperature of −50° C. and the initial concentration of reactants were as follows: isobutylene=2.4 mol l$^{-1}$; SnCl$_4$=0.10 mol l$^{-1}$ and 2-sec-butyl phenol=0.08 mol l$^{-1}$. The polymerization time (i.e., time prior to quenching with methanol), and results are set forth in Table IV below.

TABLE IV

| Polymerization Time, min. | Yield % | $\overline{M}_w$ | $\overline{M}_n$ | % Phenol-Capped Chains |
|---|---|---|---|---|
| 60 | 100.0 | 9,700 | 4,500 | 11.0 |
| 30 | 100.0 | 9,400 | 4,100 | 11.3 |
| 20 | 100.0 | 9,500 | 4,200 | 14.6 |
| 10 | 100.0 | 12,200 | 5,300 | 15.4 |

Considering cummulatively the data in Tables I–IV, it should be noted that isobutylene was polymerized in the presence of SnCl$_4$ and 2-sec-butyl phenol using methylene chloride as solvent but that polymerization could not be induced in n-heptane under similar conditions, i.e., a more polar solvent and more acidic catalyst were necessary as for example the combination of AlCl3/n-heptane in Example 2 or the AlCl3/methylene chloride of Example 1.

Infrared spectra of polyisobutylenes from all Examples displayed identical features. Two types of double bonds could be discerned. Peaks at 895 cm$^{-1}$ and 1640 cm$^{-1}$ indicated the presence of terminal gemdistributed olefins while peaks at 820 cm$^{-1}$ characteristic of trisubstituted olefins were also observed (M. St. C. Flett and P. H. Plesch, *J. Chem. Soc.*, 1952, 3355). Proton n.m.r. analyses confirmed these observations, revealing a broad singlet at $\delta=4.8$ ppm, attributable to geminal protons on a disubstituted terminal olefin, and a peak at 5.1 ppm, assigned to the proton on a trisubstituted olefin. Peaks at $\delta=7.10$, 6.95, 6.65 and 6.55 ppm, ascribed to the aromatic protons in 2-sec-butyl phenol, were also observed.

Determinations of the relative amounts of free and bound phenol in the polyisobutylene samples were made by GPC using differential U.V. spectroscopy at 280 nm. Differential refractive index measurements were found to be unreliable for this purpose. Estimates of the concentration of bound phenol were made by measuring the total phenol concentration by U.V. spectroscopy, assuming the molar extinction coefficient to be that of the monomeric phenol (2000 l mol$^{-1}$ cm$^{-1}$ for 2-sec-butyl phenol and 1450 l mol$^{-1}$ cm$^{-1}$ for 2,6-dimethyl phenol), and multiplying by the fraction of polymerically bound phenol calculated from the GPC data.

The materials used in carrying out the preceding Examples were prepared as follows: isobutylene was passed through columns of sodium-lead alloy and calcium hydride under vacuum before use. Methylene dichloride and n-heptane were purified by washing with concentrated sulfuric acid, dilute potassium hydroxide solution and distilled water. These solvents were then dried over calcium chloride and calcium hydride and fractionated from calcium hydride. The phenols, thionyl chloride, anhydrous aluminum trichloride and tin tetrachloride were used as received.

EXAMPLE 5

Block copolymers were prepared by reacting 5 grams of a mono-phenol (2-sec-butyl phenol) capped polyisobutylene and 0.75 ml toluene diisocyanate (TDI) in THF (50 cc) using 5 drops of stannous octoate as catalyst. This isocyanate-capped polyisobutylene was then added to polyethylene oxide in THF (10 g, molecular weight approximately 7500 in 100 cc solvent) and stirred for 16 hours. Thereafter, the THF was removed by evaporation and the solid residue extracted first with a pentane (a solvent for polyisobutylene) and then with methanol (a solvent for polyethylene oxide). The residue, which was largely soluble in methylene dichloride and THF, is the desired block copolymer of phenol-capped polyisobutylene coupled to PEG through the TDI linkage. Infrared analysis of the soluble residue indicated the presence of both polyisobutylene (methyl group absorbances at 1390 and 1365 cm$^{-1}$) and polyethylene oxide (C-O absorbance at 1110 cm$^{-1}$) moieties. The intrinsic viscosity of methylene dichloride solutions of this material over the temperature range 10°-40° C. exhibited the maxima and minima that are diagnostic for the presence of block or graft copolymers (Makromol, Chem., 99 275 (1966). Use of an alkali metal catalyst (e.g., sodium/paraffin dispersion) in preparing the block copolymers was not as successful as the method described above, although problems, e.g., polymer degradation could, in large measure, be due to a lack of optional reaction conditions.

EXAMPLE 6

Phenol/TDI Coupling

A phenol-capped polyisobutylene (run 10827-20-12-15) as in Example 5 was reacted with TDI as follows: 5 g of the polyisobutylene were dissolved in 50 ml THF; 0.75 ml TDI and 0.2 ml stannous octoate solution were added and the solution was brought to reflux. Infrared spectra were scanned in a sodium chloride solution cell at intervals of two hours. After four hours, the isocyanate peak at 2280 cm$^{-1}$ had been reduced in intensity by about 40 percent. No further reduction had occurred after a total reaction time of six hours, and 100 ml of a THF solution containing 10 g PEG 7500 was added together with 0.2 ml stannous octoate as catalyst (rather than Na as in Example 5). Refluxing was continued for one hour, and the system was then maintained at room temperature for a further 60 hours. At the end of this time the solvent was evaporated and the crude product subjected to extraction in a Soxhlet apparatus for seven hours with hexane and twelve hours with methanol. The hexane fraction contained polyisobutylene equivalent to the amount charged, indicating that coupling had not occurred. However, this fraction displayed strong infrared absorbances at 1720 cm$^{-1}$, 1605 cm$^{-1}$ and 3400 cm$^{-1}$ indicative of capping with TDI, while the initial polybutylene had no absorbance at 1720 cm$^{-1}$, weak absorbance at 1605 cm$^{-1}$ and a broad peak centered at 3500 cm$^{-1}$. The infrared features are consistent with the addition of TDI to phenolic endgroups. Coupling can be achieved by modifying the reaction conditions (e.g., choice of catalyst) as in Example 5.

What is claimed:

1. A block copolymer having the general structure

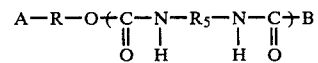

wherein A consists essentially of polyisobutylene segment; R is

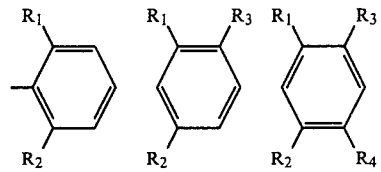

and $R_1$, $R_2$, $R_3$ and $R_4$ are independently selected from lower alkyl groups having from 1 to 4 carbon atoms and the total of $R_1$ and $R_2$ is from 2 to 10 carbons; $R_5$ is a divalent aliphatic, aromatic, cycloaliphatic or cycloalkylene group of 1 to 36 carbons; and B is a polyalkylene polyol segment.

2. A copolymer as in claim 1 wherein the A segment has a molecular weight of from 1000 to 5000.

3. A copolymer as in claim 1 wherein the B segment is polyoxyethylene.

4. A copolymer as in claim 1 wherein the B segment is polyoxypropylene.

5. A copolymer as in claim 1 wherein the B segment is a polyoxyethylene/polyoxypropylene block copolymer.

6. A copolymer as in claim 1 wherein the B segment is a randomly copolymerized oxyethylene/oxypropylene copolymer.

7. A copolymer as in claim 1 wherein $R_5$ is a divalent toluene residue.

8. A copolymer as in claim 1 wherein $R_5$ is a divalent 1,6-n-hexyl residue.

9. A copolymer as in claim 1 wherein $R_1$ and $R_2$ are methyl.

10. A process for preparing the block copolymer of claim 1 which comprises: (A) cationically polymerizing a monomer essentially consisting of isobutylene in the presence of a phenol, a Lewis acid or Friedel-Crafts catalyst and an organic solvent to produce a phenol-terminated polymer, said phenol having at least two alkyl substituents and being selected from the group consisting of:

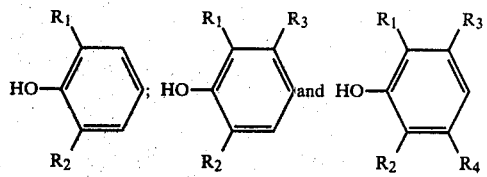

wherein $R_1$, $R_2$, $R_3$ and $R_4$ are lower alkyl groups having from 1 to 4 carbon atoms with the total number of carbons in the substituent groups being from 2 to 10; (B) subsequently reacting the phenol-terminated polymer of (A) with a diisocyanate and optionally a catalyst by a condensation reaction to form an isocyanate-terminated polymer; and (C) subsequently reacting the isocyanate-terminated polymer of (B) with a polyoxyalkylene polyol.

11. A process as in claim 10 wherein the polyoxylakylene polyol is hydrophilic.

12. A process as in claim 10 wherein the polyoxylakylene polyol is polyoxyethylene polyol.

13. A process as in claim 10 wherein the polyoxalkylene polymer is polyoxypropylene.

14. A process as in claim 10 wherein the molar isobutylene/phenol ratio in step (A) is from 10 to 1000.

15. A process as in claim 10 wherein the catalyst in step (A) is $SnCl_4$.

16. A process as in claim 10 wherein the catalyst in step (A) is $AlCl_3$.

* * * * *